April 2, 1963 J. H. HOFFMAN ET AL 3,084,320

QUADRATURE VOLTAGE SUPPRESSION DEVICE

Filed June 15, 1960

INVENTORS
JESS H. HOFFMAN
IRVING I. ROSS
THOMAS E. CONOVER

BY George C. Sullivan

Agent

United States Patent Office 3,084,320
Patented Apr. 2, 1963

3,084,320

QUADRATURE VOLTAGE SUPPRESSION DEVICE

Jess H. Hoffman, North Hollywood, and Irving I. Ross, Altadena, Calif., and Tom E. Conover, Littleton, Colo., assignors to Lockheed Aircraft Corporation, Burbank, Calif.

Filed June 15, 1960, Ser. No. 36,276
10 Claims. (Cl. 318—448)

The present invention relates to a quadrature voltage suppression method and system for an A.C. alternating current servo system having a closed loop.

Any closed loop servo system inherently involves a summation point for command and feedback signals. The resultant remainder is a vector voltage termed "an error signal." The error signal is amplified and controls the output function of the servo system. In A.C. servo systems the summation of the feedback and command signal results in an error signal consisting of two components, one in-phase with the reference voltage and one 90° out of phase. The 90° component results from a misalignment of the command and feedback voltages with respect to each other and is termed "quadrature." The quadrature voltage is usually of much greater magnitude than the error signal which will be used to control the output function of the servo system. This quadrature voltage is often times in the order of 100 to 1 for example in relation to the in-phase error signal voltage. Should the in-phase or error voltage be in the order of 10 millivolts, the input circuits must be capable of handling linearly voltages of the order of 1 volt in order to faithfully reproduce the in-phase signal. Since the input amplifiers usually have a very large gain they cannot handle such large voltages linearly and will saturate when large quadrature signals are present. They will recover from this saturated condition very slowly. To build circuits capable of such wide dynamic range on the other hand would require a large amount of expensive circuitry. The quadrature voltage is therefore detrimental to system operation because it causes saturation of the servo amplifier and reduces system operational control.

Several conventional methods of quadrature suppression are in use at the present time. These prior devices essentially attempt to correct quadrature after it has been generated. In a conventional A.C. feedback servo where the actuator operation is a function of D.C. voltage, a phase sensitive detector is employed to extract the proper phase and amplitude of the command information from the modulation on the carrier. Such a phase sensitive detector inherently rejects quadrature although saturation may have occurred in the circuitry prior to the detection. One type of such phase sensitive detector employs a gating technique and is effective to reduce the quadrature relationship to the in-phase signal only to about one-third.

An important object of the present invention is to provide a method and a means for suppressing of quadrature voltages prior to its formation. The magnitude of the quadrature component of the error signal is detected and applied to shift the phase of either the feedback or the command signal to establish coincidence in-phase relationship to minimize development of the quadrature component. This is accomplished prior to the gain stages so that the error signal to be amplified is relatively free of quadrature and therefore has the required low amplitude so that the amplifier will not saturate.

The error signal in a closed loop servo system is the vector difference between the A.C. command signal and the A.C. feedback signal. Any deviation of the carrier phase of the two signals generates a quadrature component 90° out of phase with the reference voltage. The magnitude of the quadrature is nearly proportional to the out of phase relationship between the feedback and the command signals. It can be seen that where the phase differences are great the quadrature voltage will be very large in relation to the in-phase voltage. By sampling the quadrature component a D.C. signal proportional to the quadrature signal may be extracted and applied to a phase shift network which will shift either the command or feedback signal an amount proportional to the magnitude and polarity of the demodulated quadrature signal.

Figure 1:
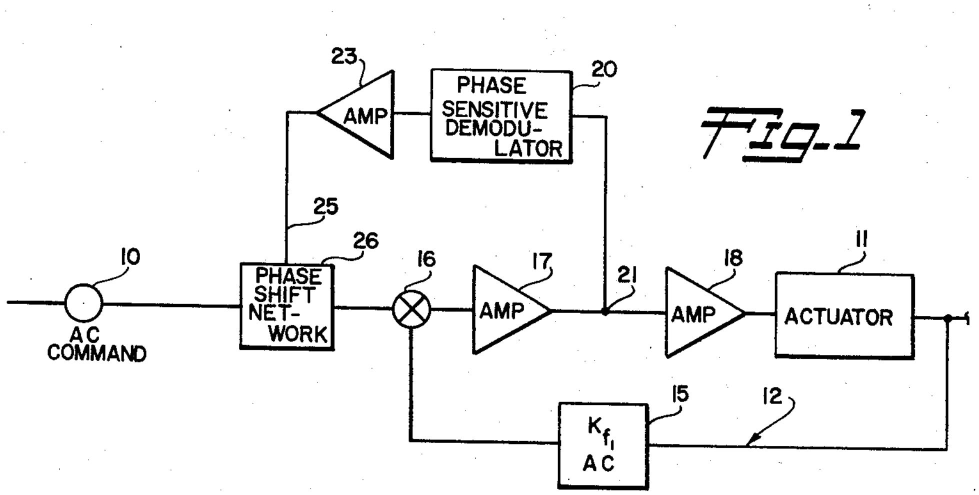
FIGURE 1 is a block diagram of the invention showing means to align the phase of the command signal with the feedback signal.

FIGURE 1 in block diagram form shows the relation of the components in a servo system involving a closed feedback loop to a summing point for shifting the phase of the command signal to agree with that of the feedback signal in order to prevent generation of the quadrature component. In the usual servo system, an A.C. command signal 10 is applied to an actuator 11 so as to achieve a desired result. The actuator 11 may be a motor or any other means to produce the desired output. A signal opposite to the command signal and proportional to the output of actuator 11 is generated by appropriate means and fed back through loop 12 to summing point 16 so that when actuator 11 reaches the point to which it was commanded by signal 10, the feedback signal will cancel out the A.C. command signal 10 so that there will be no further movement of actuator 11. An amplifier 15 may be necessary where the position sensing means for actuator 11 generates a disproportionately weak signal. Further amplifiers 17 and 18 between the summing point 16 and the actuator 11 may be necessary.

Phase sensitive demodulator 20 may be of any type of detector whose reference voltage is set at 90° with respect to the basic reference carrier phase to sense the magnitude of the quadrature voltage at point 21. One suggested demodulator would be that shown in co-pending application, Serial Number 13,838, entitled "Demodulator" to J. H. Hoffman, now Patent No. 3,034,066. The demodulator 20 develops a D.C. signal proportional to the envelope of the quadrature sensed at point 21. This D.C. signal is applied to phase shift network 26 through amplifier 23.

Figure 2:
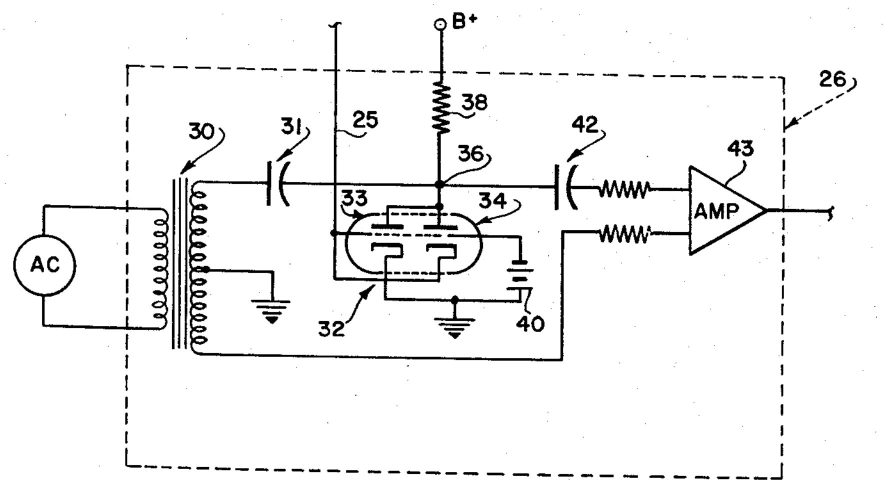
FIGURE 2 shows the detail of the phase shifting circuitry.

The phase shift network 26 is shown in FIGURE 2. The condenser 31 and the dual triode vacuum tube 32 form a parallel RC network which will effect the necessary phase shift in the command signal to coincide with that of the feedback signal. The transfer function ratio within which the network 26 will operate is:

$$\frac{1-Ts}{1+Ts}$$

which has a constant amplitude but the phase of which varies with T since the frequency is constant. This transfer function is identical to $$\frac{2}{1+Ts}-1$$

In this method, therefore, a signal corresponding to 1 is subtracted from a signal corresponding to $$\frac{2}{1+Ts}$$

as generated by the vacuum tube and condenser. The term "S" is the Laplace operator and is a measure of steady state carrier frequency. Since carrier frequency can be kept constant, the variable in the transform ratio is T. T is the time constant to be controlled by the variable D.C. control voltage coming from the detection of the quadrature magnitude.

The varying D.C. signal from the amplifier 23 is applied through line 25 to the phase shift network 26. The heart of the phase shift network 26 is an RC parallel network whose impedance element may be varied so that the phase of the A.C. command signal may be shifted an appropriate amount to align or agree with the feedback signal. Since to use the usual variable resistor would vary the end voltage in the device, thus altering the signal which would eventually be applied to actuator 11 there must be some means so that the net voltage from phase shift network 26 is equal to the input voltage.

The dynamic characteristics of a vacuum tube are such that as the grid to cathode bias varies, the internal dynamic resistance ($r_p$) of the tube changes. This can be seen by looking at the $r_p$ vs. $e_{gk}$ curves in a vacuum tube manual. By utilizing these characteristics, the output impedance of a signal triode amplifier is a function of the D.C. grid to cathode potential. This characteristic can be used as the variable passive element in the phase shift network. However, in a single triode, the net current flow is proportional to the bias. Thus, as the voltage applied to the grid varies, so also would the plate voltage vary. A single triode used as the variable passive element in a parallel RC network would shift the phase of the A.C. command signal but would also vary its voltage. A change in voltage at that point would add to or subtract from the A.C. command signal as a transient resulting in an output from actuator 11 other than that desired.

By utilizing two triodes as shown in FIGURE 2 the A.C. plate resistance ($r_p$) can be made to vary as a function of an applied D.C. signal and have the D.C. plate resistance ($R_p$) remain constant. The configuration shown in FIGURE 2 eliminates any transient occurring from variation of the D.C. level of the plate.

By applying the D.C. signal from demodulator 20 as amplified by amplifier 23 through line 25 to the grid of triode 33 and the cathode of triode 34 it can be seen that, if the grid of triode 34 and the cathode of triode 33 are biased by battery 40 in the manner shown, then as current flow through one triode rises, it will fall in the other so that the net D.C. current flow between point 36 and ground will always be constant. Thus, the voltage at point 36 will not vary as a result of the D.C. signal in line 25.

It will be noted that the slope of the $I_p$ vs. $E_p$ curves of many vacuum tubes changes for varying currents at constant voltage. That is to say that the dynamic plate resistance ($r_p$) varies with the dynamic grid voltage ($e_g$). By carefully selecting the area on the $I_p$ vs. $E_p$ curve in which to use a pair of statically and dynamically matched tubes as shown in FIGURE 2, the varying dynamic plate resistance may be used as the variable passive element of the parallel RC network to shift the phase of the incoming AC command signal.

At point 36 the signal will be a fluctuating D.C. signal by reason of the B+ voltage. Condenser 42 will block the D.C. and pass the A.C. component to the amplifier 43 and summing point 16. At summing point 16 the feedback and the command signals will be in-phase by reason of the phase shift network 26. Thus the major cause of quadrature generation will be eliminated.

It will be apparent that phase shift network 26 may be placed in the feedback loop 12 as well as the A.C. command line with similar results.

It is not intended to be restricted to one or the other paths nor to the exact configuration shown and described by way of example.

We claim the following combinations and their equivalents as our invention.

1. In a servo system including an A.C. command signal source, an actuator, a feedback loop and a summing point, means to suppress a quadrature voltage including means to demodulate the quadrature voltage and means responsive to the demodulated signal to align the phase relationship of the command signal vector and the feedback signal vector.

2. In a servo system including an A.C. command signal source, an actuator, a feedback loop and a summing point, means to suppress a quadrature voltage including means between the summing point and the actuator to demodulate the quadrature voltage and means responsive to the demodulated signal to align the phase relationship of the command signal vector and the feedback signal vector before the summing point.

3. In a servo system including an A.C. command signal source, an actuator, a feedback loop and a summing point, means to suppress a quadrature voltage including means between the summing point and the actuator to demodulate the quadrature voltage and means responsive to the magnitude and polarity of the demodulated voltage to shift the phase of the command signal vector to align with that of the feedback signal vector.

4. In a servo system including an A.C. command signal source, an actuator, a feedback loop and a summing point means to suppress a quadrature voltage including means between the summing point and the actuator to demodulate the quadrature voltage and means responsive to the magnitude and polarity of the demodulated voltage to shift the phase of the feedback signal vector to align with that of the command signal vector.

5. In a servo system including an A.C. command signal source, an actuator, a feedback loop and a summing point, means to suppress a quadrature voltage including means between the summing point and the actuator to demodulate the quadrature voltage, a parallel resistive-capacitive network between the A.C. command signal source and the summing point, means responsive to the magnitude and the polarity of the demodulated voltage to vary the value of one of the passive elements of the parallel resistive-capacitive network to shift the phase of the command signal vector to align it with the feedback signal vector.

6. In a servo system including an A.C. command signal source, an actuator, a feedback loop and a summing point, means to suppress a quadrature voltage including means between the summing point and the actuator to demodulate the quadrature voltage, a parallel resistive-capacitive network in the feedback loop before the summing point, means responsive to the magnitude and polarity of the demodulated voltage to vary the value of one of the passive elements of the parallel resistive-capacitive network to shift the phase of the feedback signal vector to align it with the command signal vector.

7. In a servo system including an A.C. command signal source, an actuator, a feedback loop and a summing point, means to suppress a quadrature voltage including means between the summing point and the actuator to demodulate the quadrature voltage, a parallel resistive-capacitive phase shift network wherein the resistive element is a vacuum tube network between the A.C. command signal source and the summing point, means responsive to the magnitude and polarity of the demodulated voltage to vary the grid volatge of the vacuum tube thereby varying its plate resistance to cause the phase shift network to shift the phase of the command signal vector to align it with the feedback signal vector.

8. In a servo system including an A.C. command signal source, an actuator, a feedback loop and a summing point, means to suppress the quadrature voltage including means between the summing point and the actuator to demodulate the quadrature voltage, a parallel resistive-capacitive phase shift network in the feedback loop before the summing point wherein the resistive element is a vacuum tube network, means responsive to the magnitude and polarity of the demodulated voltage to vary the grid voltage of the vacuum tube network of the parallel-resistive capacity phase shift network to shift the phase of the feedback signal vector to align it with the command signal vector.

9. In a servo system including an A.C. command signal source, an actuator, a feedback loop and a summing point, means to suppress a quadrature voltage including means between the summing point and the actuator to demodulate the quadrature voltage, a parallel resistive-capacitive phase shift network between the A.C. comman signal source and a summing point wherein the resistive element is comprised of a pair of dynamically and statically matched first and second triodes whose plates are connected together and which are parallely mounted with a condenser of fixed value, means to ground the cathode of the first triode, means to connect a battery between the grid of the second triode and ground, means to apply the demodulated signal to the grid of the first triode and the cathode of the second triode so that as the demodulated signal increases the currend flow through the first triode will decrease and increase through the second triode so that the total current flow through both triodes will be constant while the dynamic impedance of resistance will vary as a function of the demodulated signal so as to shift the phase of the incoming A.C. command signal vector to align it with the feedback signal vector at the summing point.

10. In a servo system including an A.C. command signal source, an actuator, a feedback loop and a summing point, means to suppress quadrature voltage including means between the summing point and the actuator to demodulate the quadrature voltage, a parallel resistive-capacitive phase shift network in the feedback loop before the summing point, the phase shift network including a condenser having a fixed value in parallel with resistive means including a vacuum tube circuit comprised of a pair of statically and dynamically matched first and second triodes, the cathode of the first triode being grounded and the grid of the second triode being connected to ground by means of a battery, the plates of the two triodes being connected together, means to apply the demodulated signal simultaneously to the grid of the first triode and the cathode of the second triode so that the net current flow through the vacuum tube network will always be constant while the dynamic impedance of the vacuum tube network will vary as a function of the polarity and magnitude of the demodulated signal so as to shift the phase of the feedback signal vector to align with that of the command signal vector.

References Cited in the file of this patent

UNITED STATES PATENTS

| | | |
|---|---|---|
| 2,564,682 | Fisk et al. | Aug. 21, 1951 |
| 2,939,084 | Findlay | May 31, 1960 |